(12) United States Patent
Kumagai et al.

(10) Patent No.: US 7,977,889 B2
(45) Date of Patent: Jul. 12, 2011

(54) DIRECT-CURRENT POWER SUPPLY DEVICE, POWER SUPPLY DEVICE FOR DRIVING LED AND SEMICONDUCTOR INTEGRATED CIRCUIT FOR DRIVING POWER SUPPLY

(75) Inventors: Keizo Kumagai, Atsugi (JP); Takashi Hiroshima, Atsugi (JP)

(73) Assignee: Mitsumi Electric Co., Ltd., Tama-Shi (JP)

( * ) Notice: Subject to any disclaimer, the term of this patent is extended or adjusted under 35 U.S.C. 154(b) by 362 days.

(21) Appl. No.: 12/348,951

(22) Filed: Jan. 6, 2009

(65) Prior Publication Data

US 2009/0174347 A1    Jul. 9, 2009

(30) Foreign Application Priority Data

Jan. 8, 2008    (JP) .................................. 2008-001356

(51) Int. Cl.
*H05B 41/16*    (2006.01)
(52) U.S. Cl. ..................... 315/247; 315/224; 315/185 S; 315/307; 315/312
(58) Field of Classification Search .................. 315/247, 315/224, 246, 225, 185 S, 291, 297, 307–326
See application file for complete search history.

(56) References Cited

U.S. PATENT DOCUMENTS

| | | | | |
|---|---|---|---|---|
| 2009/0160422 A1* | 6/2009 | Isobe et al. | ..................... | 323/349 |
| 2009/0237051 A1* | 9/2009 | Saitoh | ........................... | 323/282 |
| 2009/0278521 A1* | 11/2009 | Omi et al. | ..................... | 323/288 |

FOREIGN PATENT DOCUMENTS

JP    2007-220855 A    8/2007

* cited by examiner

*Primary Examiner* — Tuyet Thi Vo
(74) *Attorney, Agent, or Firm* — Holtz, Holtz, Goodman & Chick, PC (57) ABSTRACT

Disclosed is a direct-current power supply device, including: an inductor; a switching element to intermittently supply a current to the inductor; an output terminal connected to an external unit; a rectifying element connected between the inductor and the output terminal; a PFM comparator to generate a first pulse signal having a pulse width corresponding to a voltage proportional to an output current of the external unit; a duty control circuit to generate a second pulse signal by controlling a pulse width of an oscillation signal having a predetermined frequency in response to an externally-supplied current control signal; a logic circuit configured to output the second pulse signal during a period when the first pulse signal is at a predetermined level; and a drive circuit to generate a drive signal for driving the switching element based on the second pulse signal.

6 Claims, 13 Drawing Sheets

DIRECT-CURRENT POWER SUPPLY DEVICE, POWER SUPPLY DEVICE FOR DRIVING LED AND SEMICONDUCTOR INTEGRATED CIRCUIT FOR DRIVING POWER SUPPLY

BACKGROUND OF THE INVENTION

1. Field of the Invention

The present invention relates to a direct-current power supply device that generates a power supply voltage for driving an LED, and more particularly to an effective technique utilized for a switching power supply device that generates a power supply voltage for driving a WLED (white light emitting diode), which is used for a backlight of a liquid crystal display monitor of a mobile device such as a portable phone, and for a semiconductor integrated circuit constituting the switching power supply device for driving power supply.

2. Description of Related Art

WLED is used as a backlight of a liquid crystal display panel of a mobile device such as a portable phone. A DC-DC converter including a boost switching regulator is commonly used in a power supply device that generates a power supply voltage for driving the WLED. Feedback control is performed in such a power supply device for driving an LED. In the feedback control, an LED drive current is converted into a voltage to feed back the voltage to a control circuit, the voltage is compared with a reference voltage by an error amplifier to generate a drive pulse having a pulse width corresponding to the voltage potential difference, and a switching element intermittently supplying a current to an inductor (coil) is driven in response to the drive pulse to keep the drive current constant. Such a power supply device for driving an LED is disclosed in Japanese Patent Application Laid-Open No. 2007-220855, for example.

SUMMARY OF THE INVENTION

Figure 11:
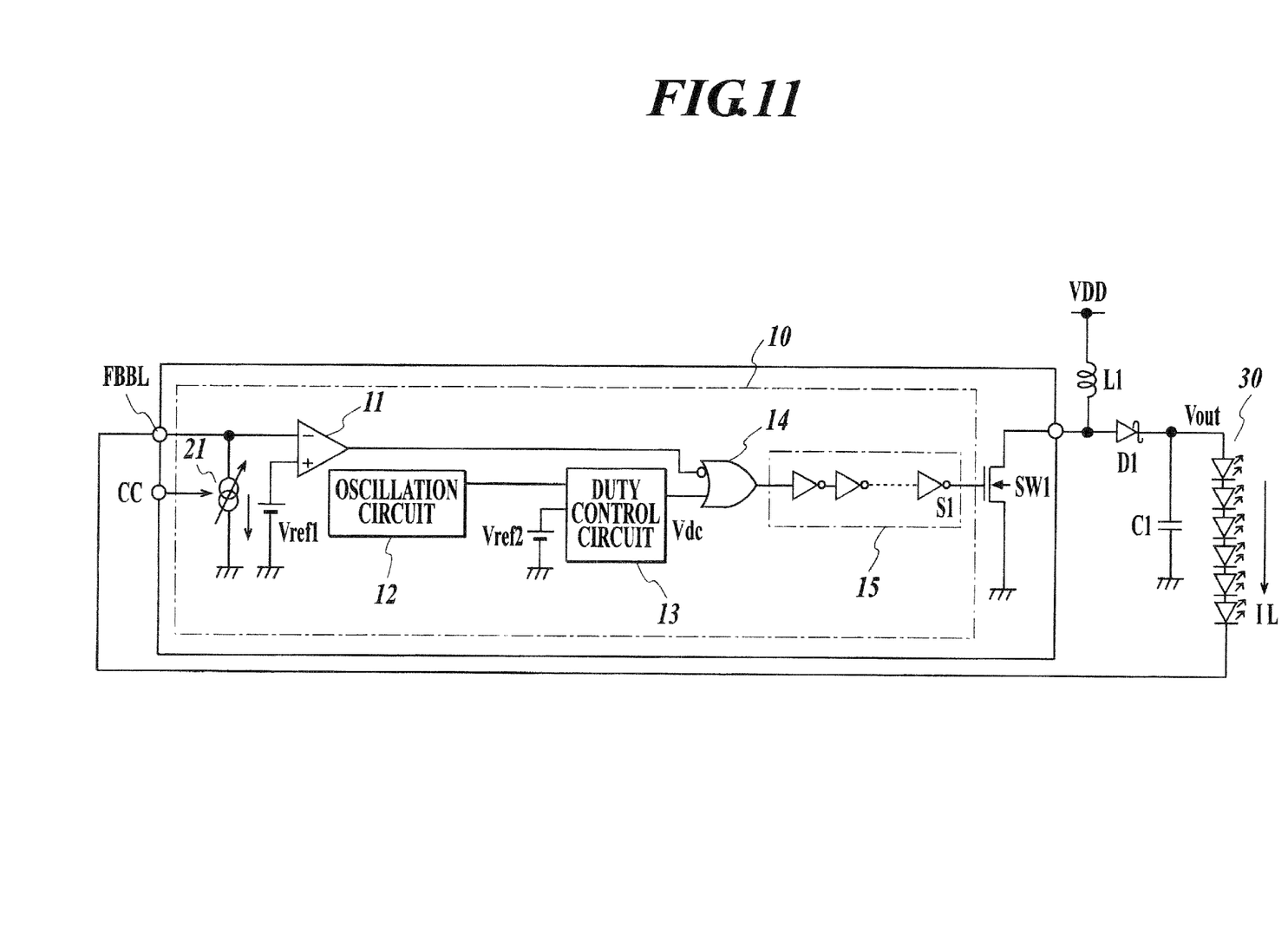
FIG. 11 shows a block diagram of a power supply device for driving an LED that the inventors have developed as a preliminary study.

There has been a demand for a function of changing brightness of a backlight of a liquid crystal display panel in stages in a mobile device. The inventors have developed and studied a power supply device for driving an LED (hereinafter referred to as "LED driving power supply device") capable or changing brightness, that is, a drive current. FIG. 11 shows a configuration of this LED driving power supply device.

The LED driving power supply device of FIG. 11 includes a PFM (pulse frequency modulation) comparator 11 and a duty control circuit 13. The PFM comparator 11 compares a reference voltage Vref1 with a voltage of a terminal FEBL to which an output current of the LED unit is fed back, and generates a first pulse signal having a pulse width corresponding to a difference between the reference voltage Vref1 and the voltage of the terminal FBBL. The duty control circuit 13 controls a pulse width of an oscillation signal having a predetermined frequency to generate a second pulse signal. The second pulse signal generated by the duty control circuit 13 is fed into a drive circuit 15 only during a period when the first pulse signal generated by the PFM comparator 11 is at a predetermined level to generate a drive signal S1 for driving a switching element SW1.

Figure 12:
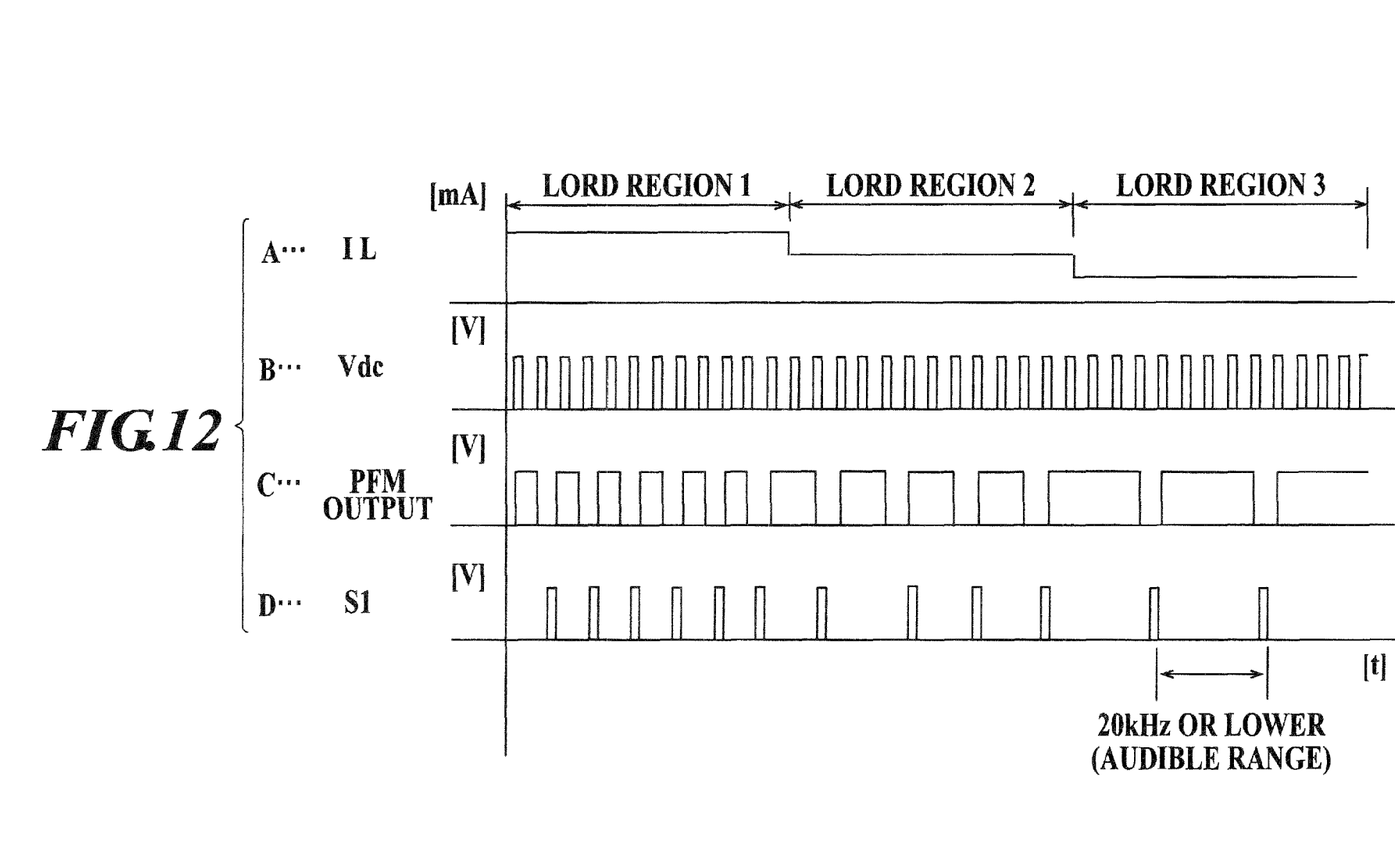
FIG. 12 shows a timing diagram of the power supply device for driving an LED of FIG. 11.
Figure 13:
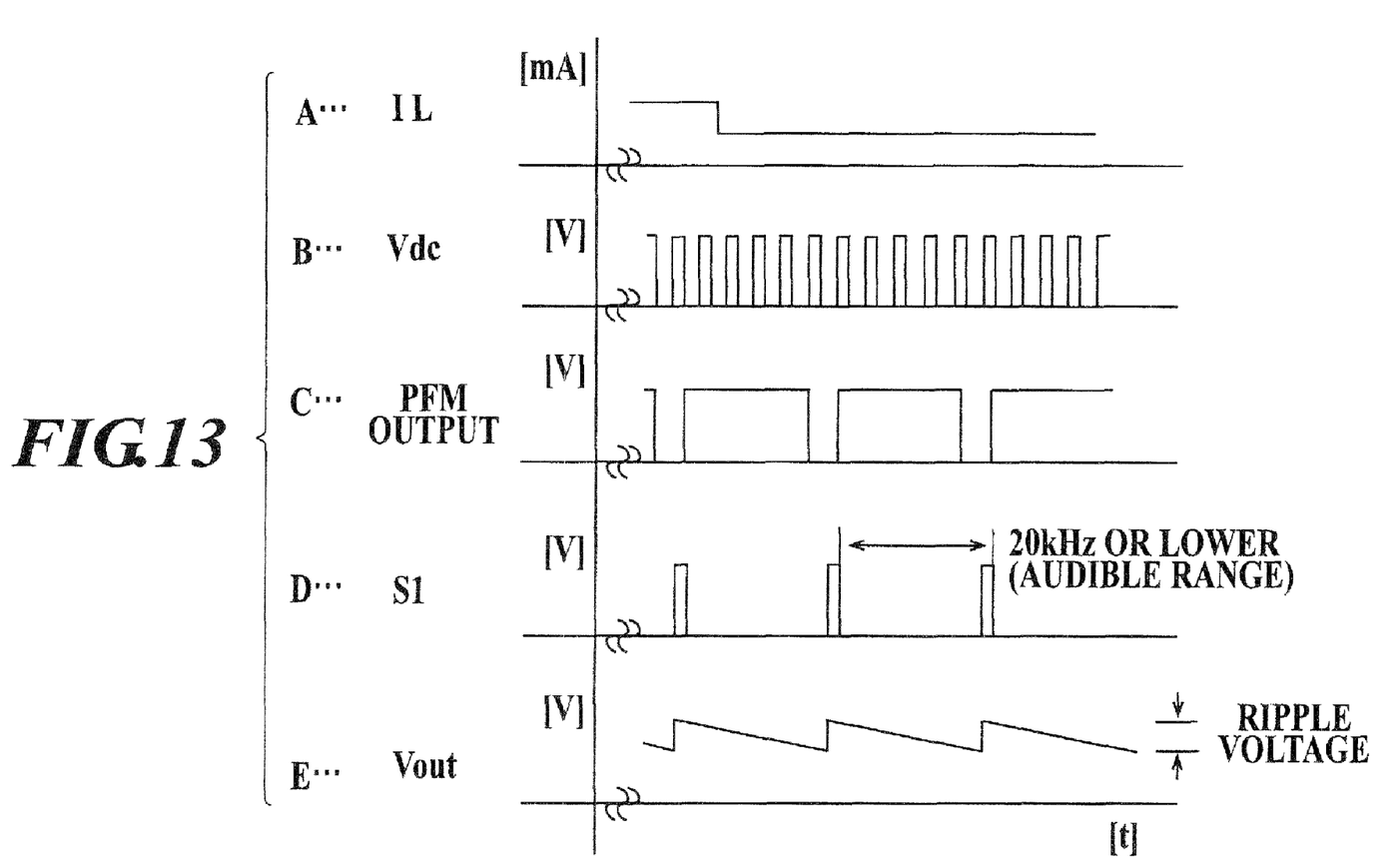
FIG. 13 shows a partially enlarged view of the timing diagram of FIG. 12 in a time direction.

In the LED driving power supply device of FIG. 11, as a drive current of the LED unit decreases in response to an externally-supplied current control signal (control code) CC, the pulse period of the drive signal S1 for driving the switching element SW1 gets longer. Accordingly, a frequency of the drive signal may be lowered to 20 kHz, which is an upper limit of an audible range of human beings, or less, as shown in FIG. 12, and a fluctuation in output voltage Vout (so-called "ripple") of the power supply device may increase as shown in FIG. 13, which may cause undesirable characteristics of the device.

It is, therefore, a main object of the present invention to provide a power supply device and a semiconductor integrated circuit for driving power supply, each of which prevents a frequency of a drive signal for driving a switching element from being lowered to an upper limit of an audible range or less, and allows a ripple of an output voltage of the power supply device to be reduced.

According to a first aspect of the present invention, there is provided a direct-current power supply device, including: an inductor; a switching element to intermittently supply a current to the inductor; an output terminal connected to an external unit; a rectifying element connected between the inductor and the output terminal; a PFM comparator to generate a first pulse signal having a pulse width corresponding to a voltage proportional to an output current of the external unit, the output current being fed back to the direct-current power supply device from the external unit; a duty control circuit to generate a second pulse signal by controlling a pulse width of an oscillation signal having a predetermined frequency in response to an externally-supplied current control signal; a logic circuit configured to output the second pulse signal generated by the duty control circuit during a period when the first pulse signal generated by the PFM comparator is at a predetermined level; and a drive circuit to generate a drive signal for driving the switching element based on the second pulse signal output from the logic circuit and output the drive signal to the switching element.

According to a second aspect of the present invention, there is provided a power supply device for driving an LED unit by supplying a drive current to the LED unit, the power supply device, including: an inductor; a switching element to intermittently supply a current to the inductor; an output terminal which is connected to the LED unit and through which the drive current is supplied to the LED unit; a rectifying element connected between the inductor and the output terminal; a PFM comparator to generate a first pulse signal having a pulse width corresponding to a voltage proportional to an output current of the LED unit, the output current being fed back to the power supply device from the LED unit; a variable current source configured to carry the output current of the LED unit in response to a current control signal; a duty control circuit to generate a second pulse signal by controlling a pulse width of an oscillation signal having a predetermined frequency in response to the current control signal; a logic circuit configured to output the second pulse signal generated by the duty control circuit during a period when the first pulse signal generated by the PFM comparator is at a predetermined level; and a drive circuit to generate a drive signal for driving the switching element based on the second pulse signal outputted from the logic circuit and output the drive signal to the switching element, wherein the duty control circuit is configured to control the pulse width of the oscillation signal so that a pulse width of the second pulse signal is narrower when the current control signal instructs to decrease the output current than when the current control signal instructs to increase the output current.

According to a third aspect of the present invention, there is provided a semiconductor integrated circuit for driving power supply, including: a switching element to intermittently supply a current to an inductor; an external terminal to which an output current of an external unit is fed back; a PFM comparator to generate a first pulse signal having a pulse width corresponding to an output voltage of the external terminal; a variable current source which is connected to the external terminal and which carries the output current of the external unit in response a current control signal; a duty control circuit to generate a second pulse signal by controlling a pulse width of an oscillation signal having a predetermined frequency in response to the current control signal; a logic circuit configured to output the second pulse signal generated by the duty control circuit during a period when the first pulse signal generated by the PFM comparator is at a predetermined level; and a drive circuit to generate a drive signal for driving the switching element based on the second pulse signal outputted from the logic circuit and output the drive signal to the switching element, wherein the duty control circuit is configured to control the pulse width of the oscillation signal so that a pulse width of the second pulse signal is narrower when the current control signal instructs to decrease the output current than when the current control signal instructs to increase the output current.

BRIEF DESCRIPTION OF THE DRAWINGS

The above and other objects, advantages and features of the present invention will become more fully understood from the detailed description given hereinbelow and the appended drawings which are given by way of illustration only, and thus are not intended as a definition of the limits of the present invention, and wherein.

DESCRIPTION OF THE PREFERRED EMBODIMENTS

Preferred embodiments of the present invention will be described below with reference to the drawings.

Figure 1:
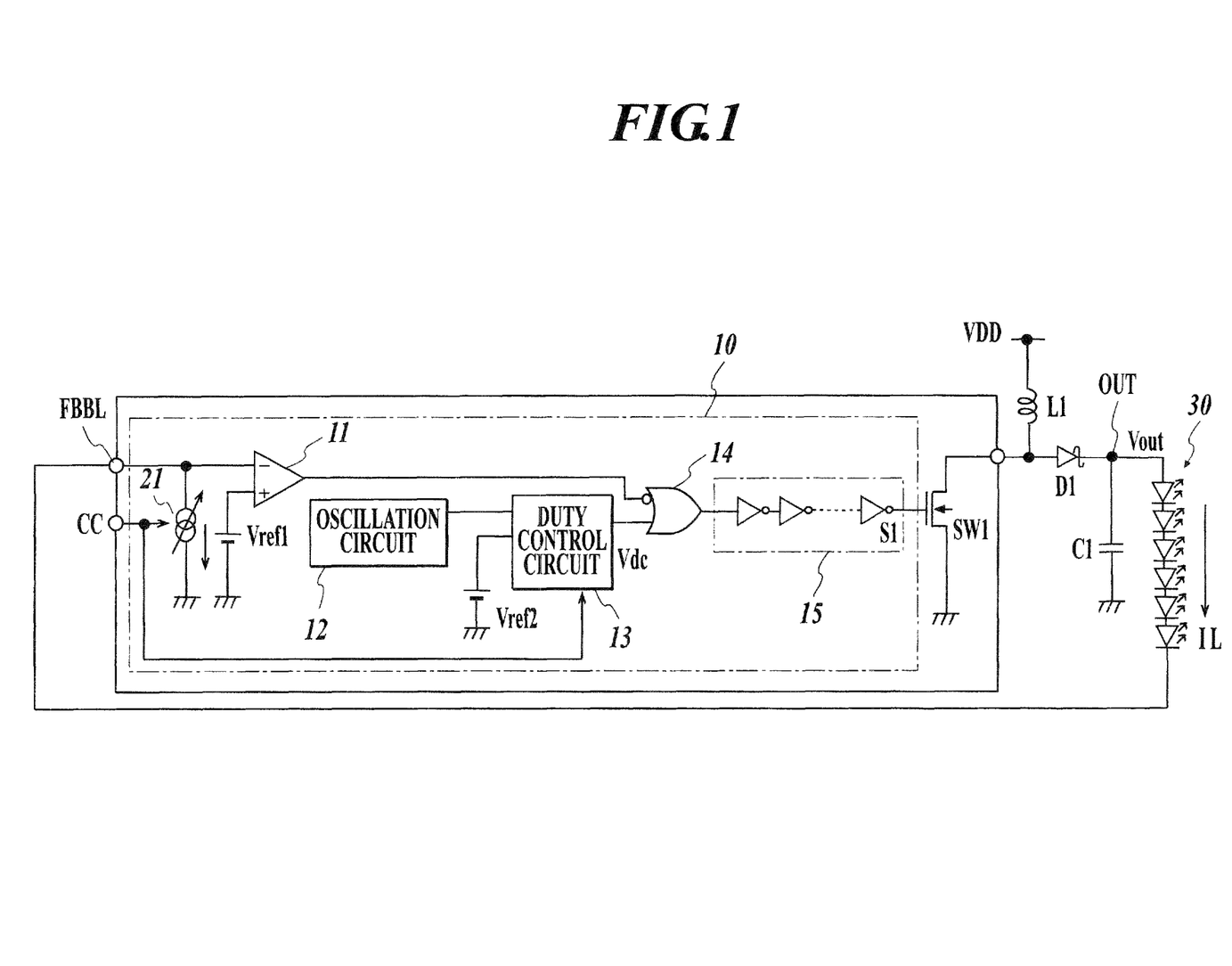
FIG. 1 shows a block diagram of a power supply device for driving an LED according to embodiments of the present invention.

FIG. 1 shows a block diagram of a power supply device for driving an LED (hereinafter referred to as "LED driving power supply device") according to embodiments of the present invention.

The LED driving power supply device of the embodiments is configured as a boost switching regulator. The LED driving power supply device includes a coil (inductor) L1 and a switching transistor SW1 having an N-channel MOSFET (insulated gate field effect transistor), both of which are connected in series between a direct-current voltage terminal VDD and a ground point. The LED driving power supply device also includes: an output terminal OUT; a diode D1 connected between the coil L1 and the output terminal OUT; a smoothing capacitor C1 connected between the output terminal OUT and the ground point; and a switching control circuit 10 that performs on-off control of the switching transistor SW1. An LED unit 30 having a plurality of white light emitting diodes WLED connected in series is connected to the output terminal OUT.

In the embodiments, the switching control circuit 10 and the switching transistor SW1 constitute a semiconductor integrated circuit (hereinafter referred to as "drive IC") and both formed on one semiconductor chip, and each of the coil L1, the diode D1 and the smoothing capacitor C1 is configured as a discrete component and connected as an external element to the drive IC. The configuration of the LED driving power supply device is not limited to the embodiments shown.

The switching control circuit 10 includes a PFM comparator 11, an oscillation circuit 12, a duty control circuit 13, an OR gate circuit 14, and a drive circuit 15. The PFM comparator 11 compares a feedback signal with a reference voltage Vref1 to generate a first pulse signal having a pulse width (variable frequency) corresponding to a potential difference between the feedback signal and the reference voltage Vref1. The oscillation circuit 12 generates an oscillation signal φosc having a predetermined frequency. The duty control circuit 13 generates a second pulse signal having a desired pulse width based on the oscillation signal φosc. An inversion signal of the first pulse signal generated by the PFM comparator 11 and the second pulse signal generated by the duty control circuit 13 are fed into the OR gate circuit 14. The drive circuit 15 receives an output signal of the OR gate circuit 14 to generate a drive signal for driving the switching transistor SW1 on and off.

The drive IC is provided with a feedback terminal FBBL to which a cathode terminal of the light emitting diodes WLED is connected. A variable current source 21 connected to the feedback terminal FBBL is provided in the drive IC so that a current passed through the light emitting diodes WLED flows through the variable current source 21 in the drive IC. An inverting input terminal of the PFM comparator 11 constituting the switching control circuit 10 is connected to the feedback terminal FBBL so that a drive current of the WLED is converted into a voltage to feed the voltage into the PFM comparator 11.

The drive IC is also provided with a terminal into which a current control code CC (current instruction value) supplied from an external CPU is fed. A current depending on the current control code CC, which is fed into the terminal, flows through the variable current source 21. In the embodiments, the control code CC is also supplied to the duty control circuit 13 so that the duty control circuit 13 can change a pulse width of the second pulse signal depending on the current flowing through the variable current source 21. Specifically, the duty control circuit 13 widens the pulse width of the second pulse signal as the current flowing through the variable current source 21 increases while the duty control circuit 13 narrows the pulse width of the second pulse signal as the current flowing through the variable current source 21 decreases.

When the drive current of the WLED is decreased due to a smaller current instruction value, the pulse width of the second pulse signal is narrowed Hence, an "on" period when the switching transistor SW1 is on is shortened, and a current passing through the coil L1 at a time is decreased. Therefore, compared to when the pulse width is not controlled according to the current instruction value, a period of the first pulse signal generated by the PFM comparator 11 does not get longer, and an on-pulse frequency of the switching transistor SW1 does not decrease.

Figure 2:
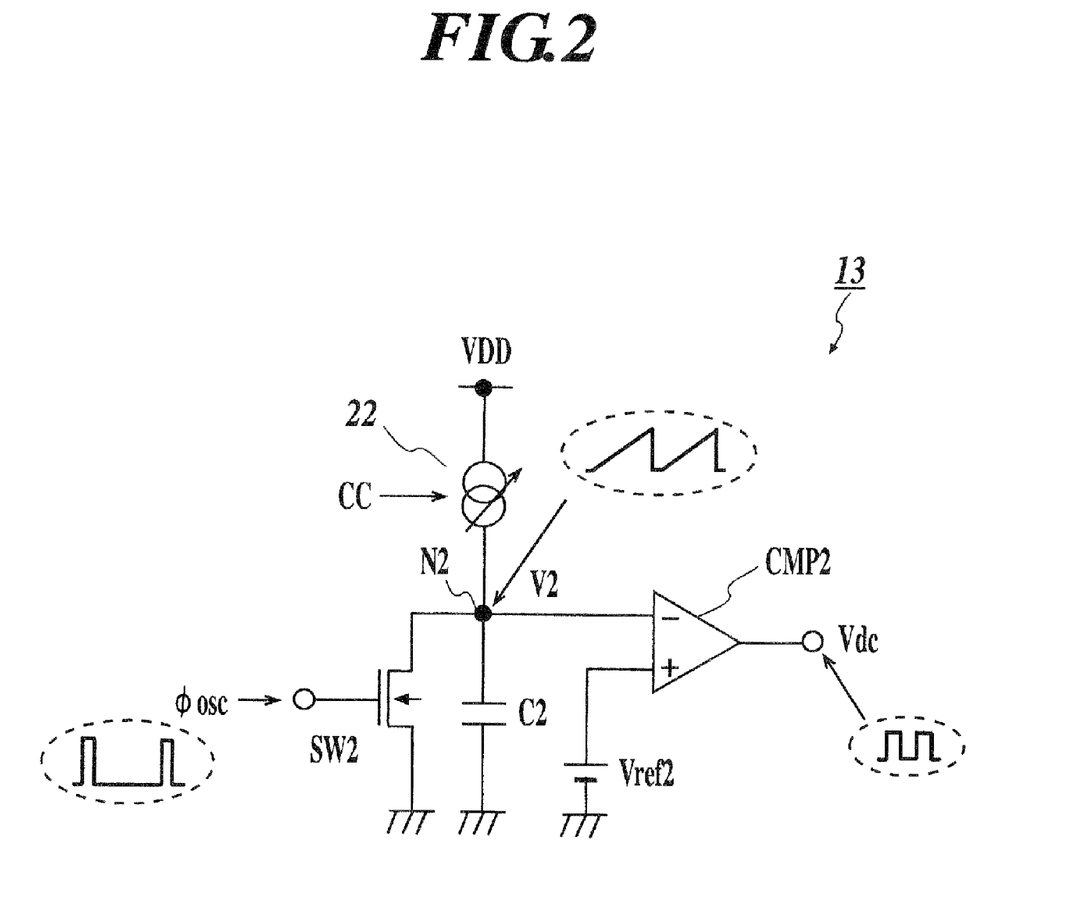
FIG. 2 shows a circuit diagram of an exemplary duty control circuit.

FIG. 2 shows a configuration of the exemplary duty control circuit 13. The duty control circuit 13 of this example includes a variable current source 22 and a capacitor C2, both of which are connected in series between a power supply voltage terminal VDD and the ground point. The duty control circuit 13 of this example also includes a switch MOSFET SW2 which is connected in parallel to the capacitor C2 and which is provided for discharge, and a comparator CMP2 that compares a reference voltage Vref2 with a potential V2 at a connection node N2 between the variable current source 22 and the capacitor C2.

Figure 3:
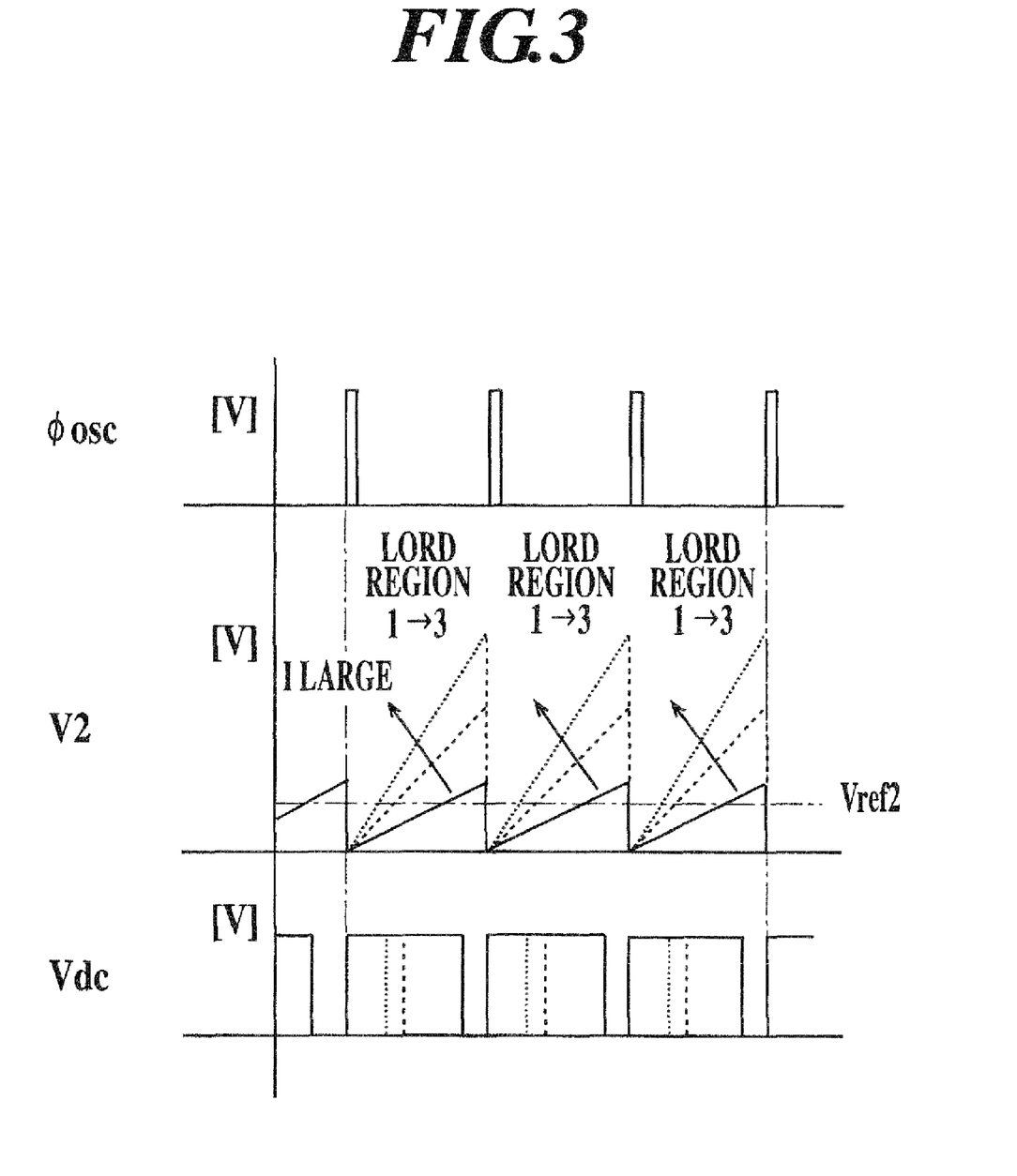
FIG. 3 shows a timing diagram of the duty control circuit of FIG. 2.

The oscillation signal ϕosc from the oscillation circuit 12 is applied to the gate terminal of the switch MOSFET SW2. During a period when the oscillation signal ϕosc is at a low level, the switch MOSFET SW2 is off, and the capacitor C2 is charged by a current from the variable current source 22 to gradually raise the potential V2 at the connection node N2. During a period when the oscillation signal ϕosc is at a high level, the switch MOSFET SW2 is turned on, and the capacitor C2 is discharged. Accordingly, the potential V2 at the node N2 varies like a sawtooth shape. As shown in FIG. 3, the comparator CMP2 compares the potential of sawtooth waveform with the reference voltage Vref2 to generate a rectangular wave having a desired pulse width according to a gradient of the sawtooth waveform and a level of the reference voltage Vref2. A signal having a frequency of 1 MHz is used as the oscillation signal ϕosc, for example.

In the duty control circuit 13 of this example, changing the current of the variable current source 22 in stages depending on the control code CC causes a change in the gradient of the sawtooth wave V2 and a change in the pulse width of the rectangular wave Vdc accordingly as indicated by broken lines in FIG. 3. Specifically, as the current of the variable current source 22 is increased, the gradient of the sawtooth wave V2 is increased and the pulse width of the rectangular wave Vdc is narrowed. A change in the current of the variable current source 21 and a change in the current of the variable current source 22 with respect to the control code CC are inverse to each other. That is, when the current of the variable current source 21 is increased in response to the control code CC, the current of the variable current source 22 is decreased.

Next, an operation of the LED driving power supply device of FIG. 1 will be described with reference to FIGS. 4 and 5 while comparing FIGS. 4 and 5 with FIGS. 12 and 13. FIG. 5 shows a partially enlarged view of a timing diagram of FIG. 4 in a time direction. FIG. 13 shows a partially enlarged view of a timing diagram of FIG. 12 in a time direction.

In the power supply device having the configuration of FIG. 11, when the control code CC instructs to decrease the current IL of the LED unit 30 as shown in FIG. 12-(A), a period of the first pulse signal of the PFM comparator 11 gets longer and the pulse width (high-level period) is widened as shown in FIG. 12-(C) Since the OR gate 14 allows the second pulse signal of the duty control circuit 13 to pass during a period when the first pulse signal is at a low level, the interval of the drive pulse S1 of the switching transistor SW1 is gradually widened as shown in FIG. 12-(D). As a result, the frequency of the drive pulse may be lowered to 20 kHz, which is the upper limit of the audible range of human beings, or less, and the ripple of the output voltage Vout may be increased as shown in FIG. 13-(E).

Figure 4:
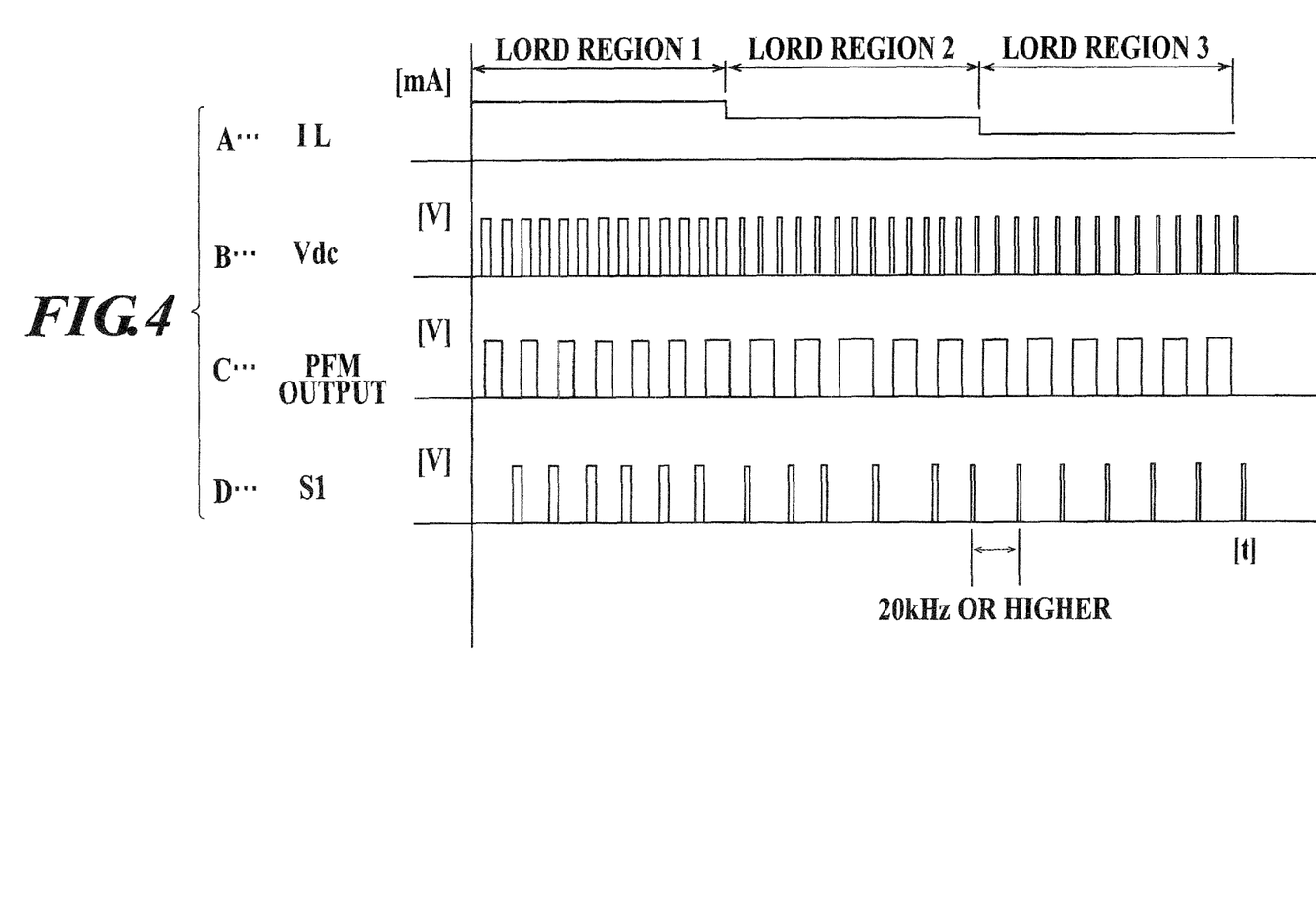
FIG. 4 shows a timing diagram of the power supply device for driving an LED of FIG. 1.
Figure 5:
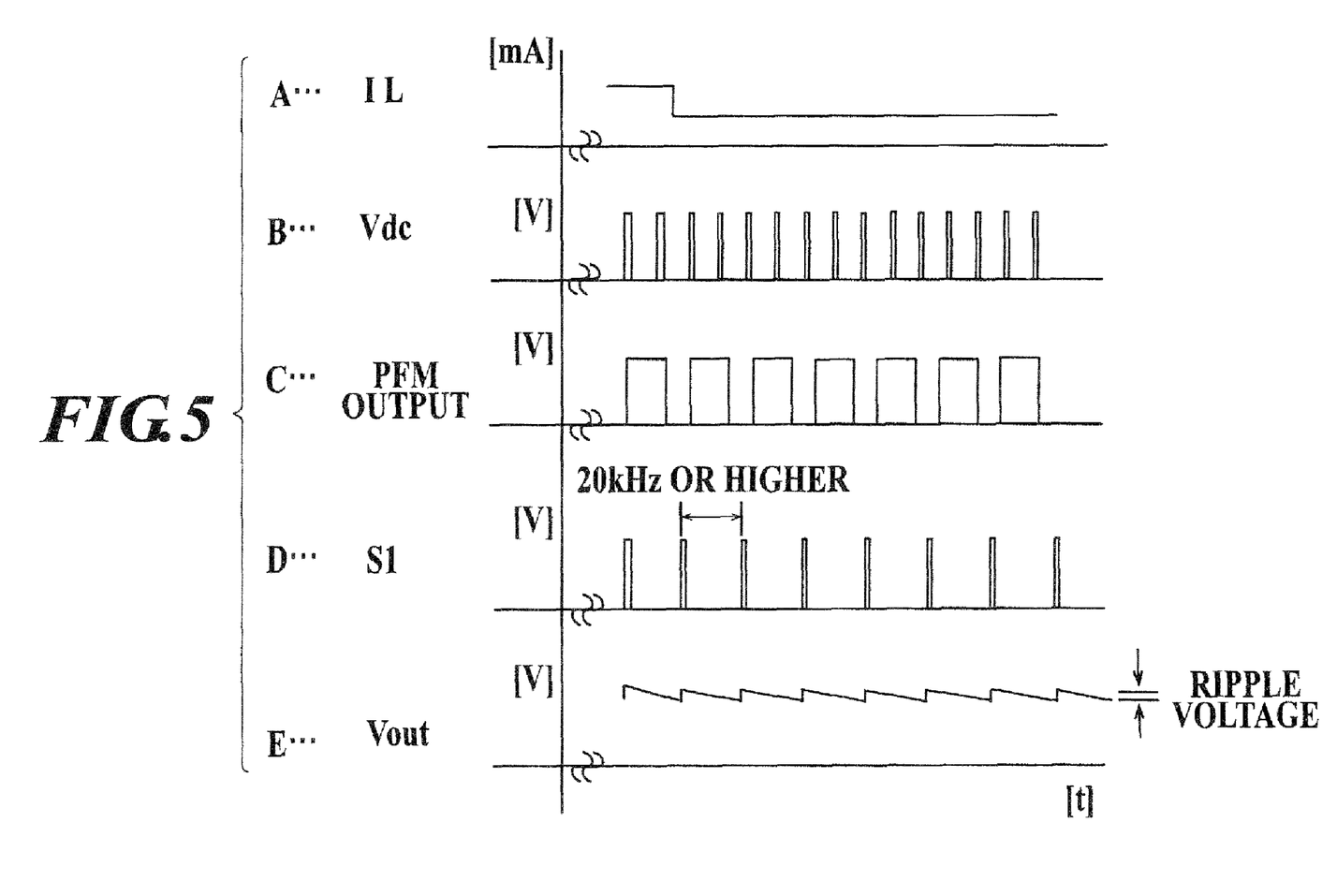
FIG. 5 shows a partially enlarged view of the timing diagram of FIG. 4 in a time direction.

On the other hand, in the power supply device of FIG. 1, even if the control code CC instructs to decrease the current IL of the LED unit 30, the period of the first pulse signal generated by the PFM comparator 11 does not get longer, nor is the pulse width (high-level period) widened as shown in FIG. 4-(C). This is because, when the current instruction value is lowered, the pulse width of the second pulse signal generated by the duty control circuit 13 is narrowed as shown in FIG. 4-(B), which causes the "on" period when the switching transistor SW1 is on to be shortened and the current flowing through the coil L1 at a time to be decreased.

Thus, because the period of the first pulse signal generated by the PFM comparator 11 is not lengthened even if the current instruction value is decreased, the interval of the drive pulse for driving the switching transistor SW1 is not widened too much as shown in FIG. 4-(D). As a result, the frequency of the drive pulse is not lowered to 20 kHz, which is the upper limit of the audible range of human beings, or less, and the ripple of the output voltage Vout is reduced as shown in FIG. 5-(E)

Figure 6:
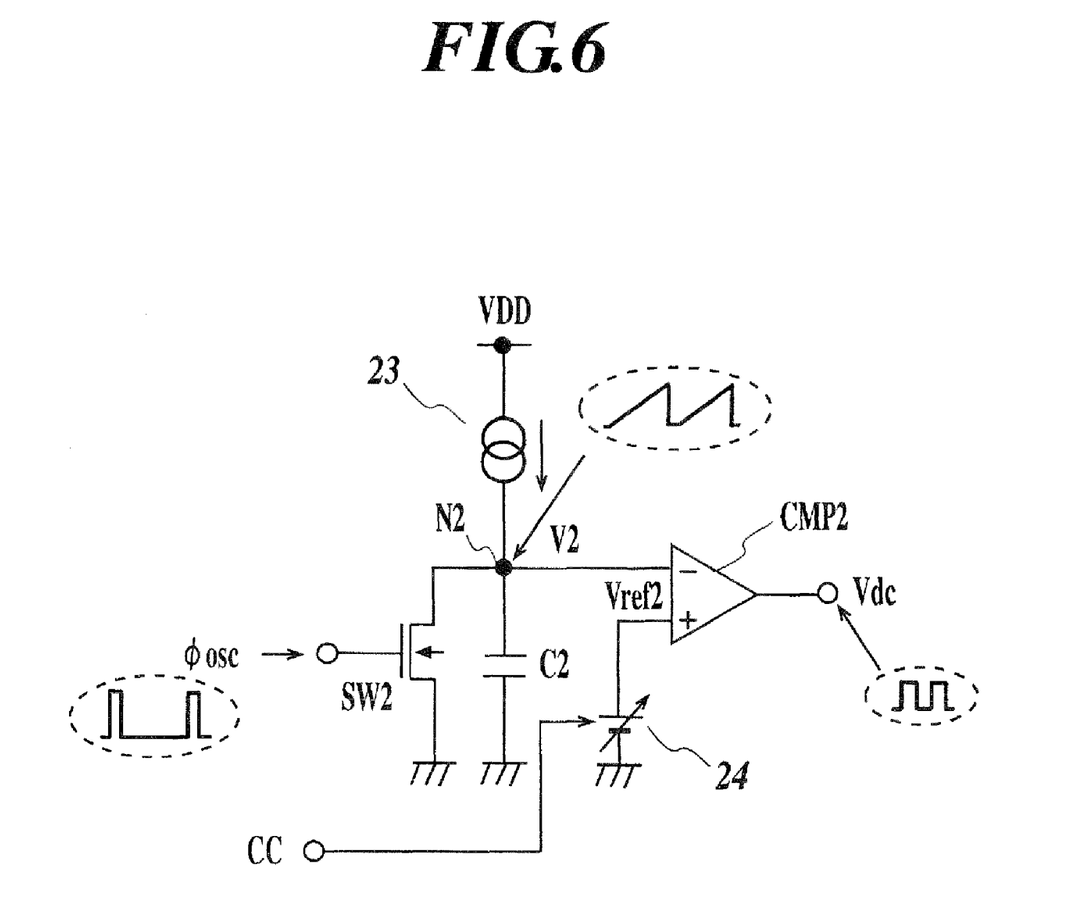
FIG. 6 shows a circuit diagram of another exemplary duty control circuit.
Figure 8:
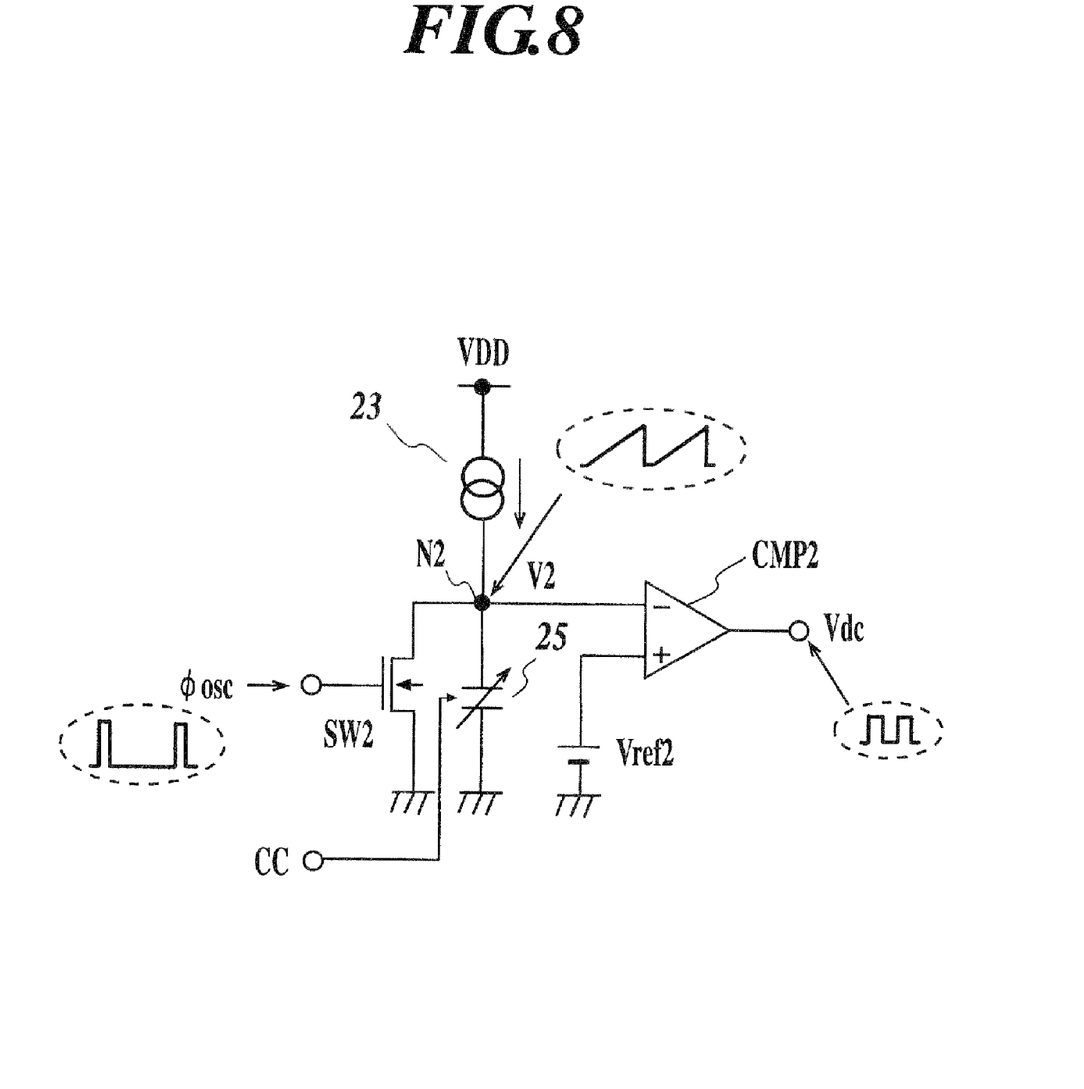
FIG. 8 shows a circuit diagram of yet another exemplary duty control circuit.

FIGS. 6 and 8 show other configurations of the duty control circuit 13.

In the duty control circuit of FIG. 6, a constant current source 23 is used instead of the variable current source 22 in the circuit of FIG. 2, and a variable voltage circuit 24 is provided instead of a constant voltage source which supplies the constant reference voltage Vref2. The variable voltage circuit 24 includes a ladder resistor having a plurality of resistors connected in series, and a plurality of switches provided in parallel to the respective resistors, for example. The switches are selectively turned on and off in response to the control code CC so as to generate a divided voltage into which the reference voltage Vref2 is divided with a proper opposite ratio.

Figure 7:
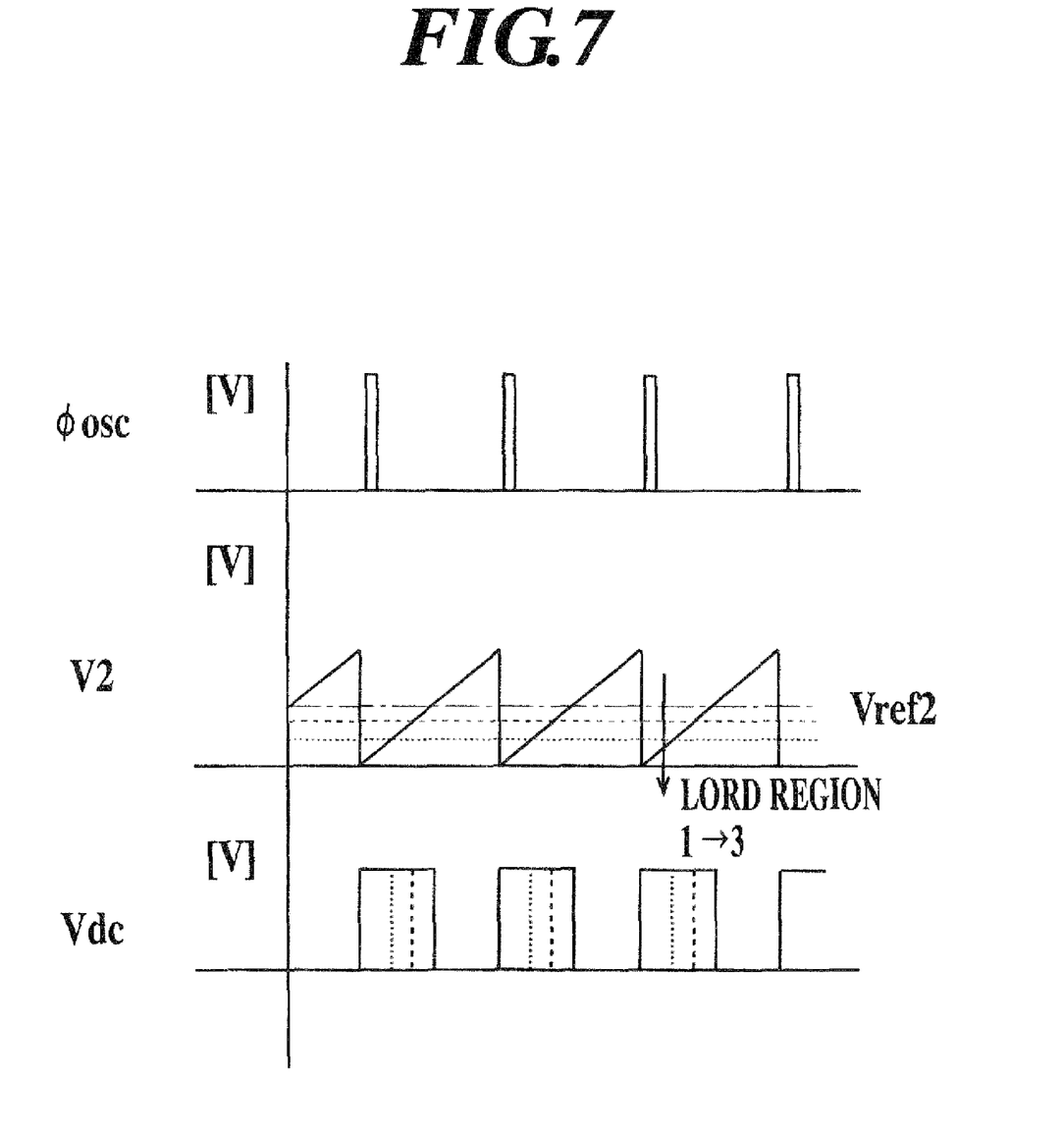
FIG. 7 shows a timing diagram of the duty control circuit of FIG. 6.

The duty control circuit of FIG. 6 is controlled such that the reference voltage Vref2 to be supplied to the comparator CMP2 is lowered when the control code CC instructs to decrease the current IL of the LED unit 30. Therefore, as indicated by broken lines of FIG. 7, the pulse width of the second pulse signal to be generated by the duty control circuit is narrowed. That is, the power supply device including the duty control circuit of FIG. 6 has a similar function to the power supply device of the embodiment shown in FIG. 1.

In the duty control circuit of FIG. 8, the constant current source 23 is used instead of the variable current source 22 in the circuit of FIG. 2, and a variable capacitor 25 is provided instead of the capacitor C2. The variable capacitor 25 includes a plurality of capacitor elements connected in parallel and a plurality of switches provided in series with the respective capacitor elements, for example. The switches are selectively turned on and off by the control code CC so that the capacitance can be varied by changing the number of capacitor elements to be connected to the node N2.

Figure 9:
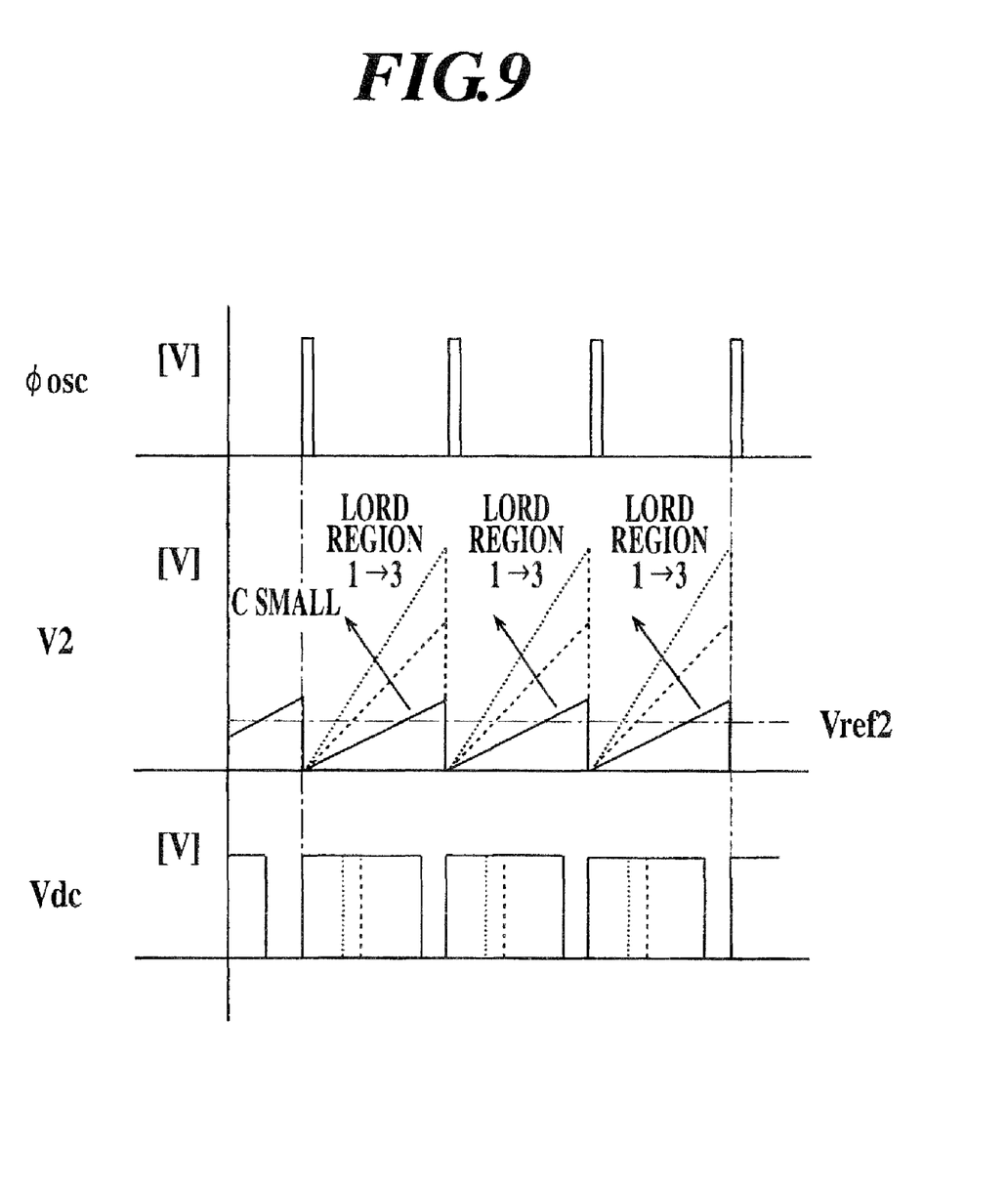
FIG. 9 shows a timing diagram of the duty control circuit of FIG. 8.

The duty control circuit of FIG. 8 is controlled such that the number of capacitor elements connected to the node N2 is decreased to reduce the capacitance when the control code CC instructs to decrease the current IL of the LED unit 30. Therefore, as indicated by broken lines in FIG. 9, as the gradient of the potential V2 at the node N2 becomes steeper, the pulse width of the second pulse signal generated by the duty control circuit is narrowed. That is, the power supply device including the duty control circuit of FIG. 8 has a similar function to the power supply device of the embodiment shown in FIG. 1.

Figure 10:
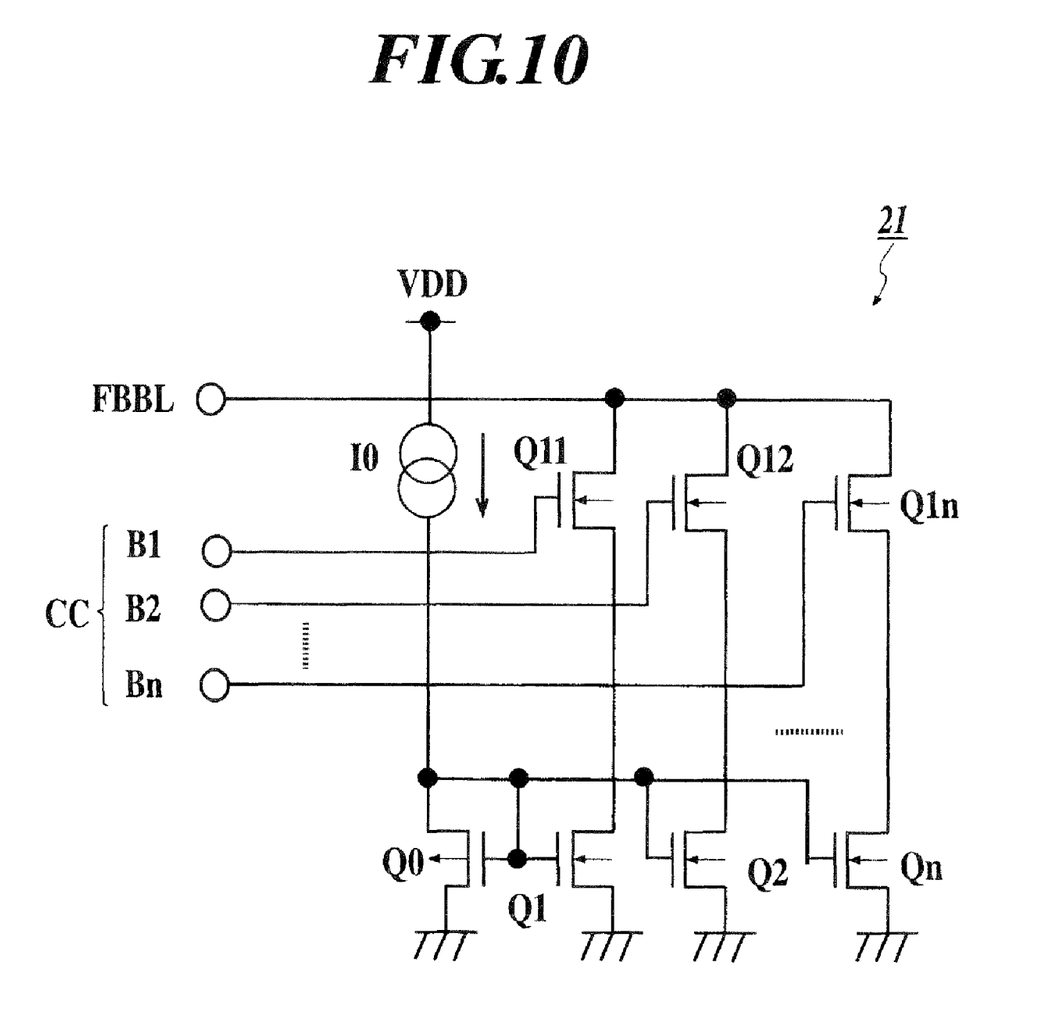
FIG. 10 shows a circuit diagram of an exemplary variable current source.

FIG. 10 shows a circuit diagram of the exemplary variable current source 21. The variable current source 21 includes a constant current source IO, a current-voltage conversion MOSFET Q0 connected in series with the constant current source I0, n MOSFETs Q1, Q2, ..., and Qn that are connected to the MOSFET Q0 in a current mirror manner, and n switch MOSFETs Q11 to Q1n that are respectively connected in series with the MOSFETs Q1 to Qn between the feedback terminal FBBL and the ground point. The currents pass through the MOSFETs Q1 to Qn according to size ratios of the MOSFETs Q1 to Qn to the current voltage conversion MOSFET Q0.

The control code CC includes bit signals E1 to En The bit signals E1 to Bn of the control code CC are applied to gate terminals of the switch MOSFETs Q11 to Q1n, respectively. The total current varies depending on the number of MOSFETs that are turned on by the bit signals B1 to En. The MOSFETs Q1 to Qn and the switch MOSFETs Q11 to Q1n are formed by N-channel MOSFETs. The variable current source 22 in the duty control circuit of FIG. 2 has a configuration that is vertically symmetrical with the circuit of FIG. 10, the MOSFETs Q1 to Qn and the switch MOSFETs Q11 to Q1n are formed by P-channel MOSFETs, and the sources of the MOSFETs Q1 to Qn are connected to the power supply voltage VDD instead of the ground point.

Although the exemplary embodiments contemplated by the inventors of carrying out the invention have been shown and described, the invention is not limited to the above-described embodiments shown. For example, in the power supply device of FIG. 1, the oscillation circuit 12 is provided in the drive IC. Alternatively, the oscillation signal generated outside the chip may be fed into the power supply device. Although MOSFET is used as the switching element SW1 in FIG. 1, a bipolar transistor may be employed as the switching element SW1.

In the above-described embodiments, the switching transistor SW1 constituting the switching regulator is provided in the chip of the drive IC. Alternatively, the switching transistor SW1 may be provided as an external element of the drive IC because a relatively large current passes through the switching transistor SW1. In the above-described embodiments, the control code CC as a command regarding the drive current is fed into the drive IC from the outside. Alternatively, an analog signal may be used as the drive current command instead of the control code.

Although the present invention is applied to the LED driving power supply device in the above description, the present invention is not limited to the LED driving power supply device. The invention can widely be applied to a boost type power supply device in which the feedback control of the output current is performed.

According to a first aspect of the preferred embodiments of the present invention, there is provided a direct-current power supply device, including: an inductor; a switching element to intermittently supply a current to the inductor; an output terminal connected to an external unit; a rectifying element connected between the inductor and the output terminal; a PFM comparator to generate a first pulse signal having a pulse width corresponding to a voltage proportional to an output current of the external unit, the output current being fed back to the direct-current power supply device from the external unit; a duty control circuit to generate a second pulse signal by controlling a pulse width of an oscillation signal having a predetermined frequency in response to an externally-supplied current control signal; a logic circuit configured to output the second pulse signal generated by the duty control circuit during a period when the first pulse signal generated by the PFM comparator is at a predetermined level; and a drive circuit to generate a drive signal for driving the switching element based on the second pulse signal output from the logic circuit and output the drive signal to the switching element.

According to a second aspect of the preferred embodiments of the present invention, there is provided a power supply device for driving an LED unit by supplying a drive current to the LED unit, the power supply device, including: an inductor; a switching element to intermittently supply a current to the inductor; an output terminal which is connected to the LED unit and through which the drive current is supplied to the LED unit; a rectifying element connected between the inductor and the output terminal; a PFM comparator to generate a first pulse signal having a pulse width corresponding to a voltage proportional to an output current of the LED unit, the output current being fed back to the power supply device from the LED unit; a variable current source configured to carry the output current of the LED unit in response a current control signal; a duty control circuit to generate a second pulse signal by controlling a pulse width of an oscillation signal having a predetermined frequency in response to the current control signal; a logic circuit configured to output the second pulse signal generated by the duty control circuit during a period when the first pulse signal generated by the PFM comparator is at a predetermined level; and a drive circuit to generate a drive signal for driving the switching element based on the second pulse signal outputted from the logic circuit and output the drive signal to the switching element, wherein the duty control circuit is configured to control the pulse width of the oscillation signal so that a pulse width of the second pulse signal is narrower when the current control signal instructs to decrease the output current than when the current control signal instructs to increase the output current.

With these structures, when the output current is decreased, an "on" period when the switching element is on is shortened. Therefore, a period of the first pulse signal from the PFM comparator does not become extremely long even when the output current is decreased. These features prevent a frequency of the drive signal for driving the switching element from being lowered to an upper limit of an audible range of human beings, or less, and allow a ripple of an output voltage of the power supply device to be reduced Preferably, the duty control circuit includes: a second variable current source configured to carry a current in response to the current control signal; a capacitor element connected in series with the second variable current source; a discharge switch which is connected to a node between the second variable current source and the capacitor element and which is turned on and off in response to the oscillation signal; and a second comparator to compare a potential of the node with a predetermined reference voltage, wherein the second variable current source is configured to carry more current when the current control signal instructs to decrease the output current than when the current control signal instructs to increase the output current.

Preferably, the duty control circuit includes: a constant current source; a capacitor element connected in series with the constant current source; a discharge switch which is connected to a node between the constant current source and the capacitor element and which is turned on and off in response to the oscillation signal; a variable voltage unit to output a reference voltage in response to the current control signal; and a second comparator to compare a potential of the node with the reference voltage outputted from the variable voltage unit, wherein the variable voltage unit is configured so that the reference voltage is lower when the current control signal instructs to decrease the output current than when the current control signal instructs to increase the output current.

Preferably, the duty control circuit includes: a constant current source; a variable capacitor unit which is connected in series with the constant current source and which varies capacitance in response to the current control signal; a discharge switch which is connected to a node between the constant current source and the variable capacitor unit and which is turned on and off in response to the oscillation signal; and a second comparator to compare a potential of the node with a predetermined reference voltage, wherein the variable capacitor unit is configured so that the capacitance is lower when the current control signal instructs to decrease the output current than when the current control signal instructs to increase the output current.

According to a third aspect of the preferred embodiments of the present invention, there is provided a semiconductor integrated circuit for driving power supply; including: a switching element to intermittently supply a current to an inductor; an external terminal to which an output current of an external unit is fed back; a PFM comparator to generate a first pulse signal having a pulse width corresponding to an output voltage of the external terminal; a variable current source which is connected to the external terminal and which carries the output current of the external unit in response a current control signal; a duty control circuit to generate a second pulse signal by controlling a pulse width of an oscillation signal having a predetermined frequency in response to the current control signal; a logic circuit configured to output the second pulse signal generated by the duty control circuit during a period when the first pulse signal generated by the PFM comparator is at a predetermined level; and a drive circuit to generate a drive signal for driving the switching element based on the second pulse signal outputted from the logic circuit and output the drive signal to the switching element, wherein the duty control circuit is configured to control the pulse width of the oscillation signal so that a pulse width of the second pulse signal is narrower when the current control signal instructs to decrease the output current than when the current control signal instructs to increase the output current.

With these structures, it is possible to realize a power supply device and a semiconductor integrated circuit for driving power supply, each of which prevents a frequency of the drive signal for driving the switching element from being lowered to an upper limit of an audible range or less, and allows a ripple of an output voltage of the power supply device to be reduced.

The entire disclosure of Japanese Patent Application No. 2008-001356 filed on Jan. 8, 2008 including description, claims, drawings, and abstract are incorporated herein by reference in its entirety.

Although various exemplary embodiments have been shown and described, the invention is not limited to the embodiments shown. Therefore, the scope of the invention is intended to be limited solely by the scope of the claims that follow.

What is claimed is:

1. A direct-current power supply device, comprising:
   an inductor;
   a switching element to intermittently supply a current to the inductor;
   an output terminal connected to an external unit;
   a rectifying element connected between the inductor and the output terminal;
   a PFM comparator to generate a first pulse signal having a pulse width corresponding to a voltage proportional to an output current of the external unit, the output current being fed back to the direct-current power supply device from the external unit;
   a duty control circuit to generate a second pulse signal by controlling a pulse width of an oscillation signal having a predetermined frequency in response to an externally-supplied current control signal;
   a logic circuit configured to output the second pulse signal generated by the duty control circuit during a period when the first pulse signal generated by the PFM comparator is at a predetermined level; and
   a drive circuit to generate a drive signal for driving the switching element based on the second pulse signal output from the logic circuit and output the drive signal to the switching element.

2. A power supply device for driving an LED unit by supplying a drive current to the LED unit, the power supply device, comprising:
   an inductor;
   a switching element to intermittently supply a current to the inductor;
   an output terminal which is connected to the LED unit and through which the drive current is supplied to the LED unit;
   a rectifying element connected between the inductor and the output terminal;
   a PFM comparator to generate a first pulse signal having a pulse width corresponding to a voltage proportional to an output current of the LED unit, the output current being fed back to the power supply device from the LED unit;
   a variable current source configured to carry the output current of the LED unit in response a current control signal;
   a duty control circuit to generate a second pulse signal by controlling a pulse width of an oscillation signal having a predetermined frequency in response to the current control signal;
   a logic circuit configured to output the second pulse signal generated by the duty control circuit during a period when the first pulse signal generated by the PFM comparator is at a predetermined level; and
   a drive circuit to generate a drive signal for driving the switching element based on the second pulse signal outputted from the logic circuit and output the drive signal to the switching element, wherein
   the duty control circuit is configured to control the pulse width of the oscillation signal so that a pulse width of the second pulse signal is narrower when the current control signal instructs to decrease the output current than when the current control signal instructs to increase the output current.

3. The power supply device according to claim 2, wherein the duty control circuit comprises:
   a second variable current source configured to carry a current in response to the current control signal;
   a capacitor element connected in series with the second variable current source;
   a discharge switch which is connected to a node between the second variable current source and the capacitor element and which is turned on and off in response to the oscillation signal; and
   a second comparator to compare a potential of the node with a predetermined reference voltage, wherein
   the second variable current source is configured to carry more current when the current control signal instructs to decrease the output current than when the current control signal instructs to increase the output current.

4. The power supply device according to claim 2, wherein the duty control circuit comprises:
   a constant current source;
   a capacitor element connected in series with the constant current source;
   a discharge switch which is connected to a node between the constant current source and the capacitor element and which is turned on and off in response to the oscillation signal;
   a variable voltage unit to output a reference voltage in response to the current control signal; and
   a second comparator to compare a potential of the node with the reference voltage outputted from the variable voltage unit, wherein
   the variable voltage unit is configured so that the reference voltage is lower when the current control signal instructs to decrease the output current than when the current control signal instructs to increase the output current.

5. The power supply device according to claim 2, wherein the duty control circuit comprises:
   a constant current source;
   a variable capacitor unit which is connected in series with the constant current source and which varies capacitance in response to the current control signal;
   a discharge switch which is connected to a node between the constant current source and the variable capacitor unit and which is turned on and off in response to the oscillation signal; and
   a second comparator to compare a potential of the node with a predetermined reference voltage, wherein
   the variable capacitor unit is configured so that the capacitance is lower when the current control signal instructs to decrease the output current than when the current control signal instructs to increase the output current.

6. A semiconductor integrated circuit for driving power supply, comprising:
   a switching element to intermittently supply a current to an inductor;
   an external terminal to which an output current of an external unit is fed back;
   a PFM comparator to generate a first pulse signal having a pulse width corresponding to an output voltage of the external terminal;
   a variable current source which is connected to the external terminal and which carries the output current of the external unit in response a current control signal;
   a duty control circuit to generate a second pulse signal by controlling a pulse width of an oscillation signal having a predetermined frequency in response to the current control signal;
   a logic circuit configured to output the second pulse signal generated by the duty control circuit during a period when the first pulse signal generated by the PFM comparator is at a predetermined level; and
   a drive circuit to generate a drive signal for driving the switching element based on the second pulse signal outputted from the logic circuit and output the drive signal to the switching element, wherein
   the duty control circuit is configured to control the pulse width of the oscillation signal so that a pulse width of the second pulse signal is narrower when the current control signal instructs to decrease the output current than when the current control signal instructs to increase the output current.

\* \* \* \* \*